United States Patent [19]

Conwell et al.

[11] Patent Number: 5,547,479
[45] Date of Patent: Aug. 20, 1996

[54] ALPHA ABRASIVE ALUMINA-BASED GRAIN HAVING AN AS SINTERED OUTER SURFACE

[75] Inventors: Stanley L. Conwell, East Bethel; William P. Wood, Golden Valley, both of Minn.

[73] Assignee: Minnesota Mining and Manufacturing Company, St. Paul, Minn.

[21] Appl. No.: 453,562

[22] Filed: May 26, 1995

Related U.S. Application Data

[63] Continuation of Ser. No. 174,431, Dec. 28, 1993, abandoned.

[51] Int. Cl.$^6$ .................................................. C09C 1/68
[52] U.S. Cl. .............................. 51/309; 51/295; 501/153
[58] Field of Search ................... 51/309, 295; 501/153

[56] References Cited

U.S. PATENT DOCUMENTS

| | | | |
|---|---|---|---|
| 2,416,908 | 3/1947 | Cornelius | 263/41 |
| 3,722,870 | 3/1973 | Griffin | 266/20 |
| 3,802,893 | 4/1974 | Kiger et al. | 51/309 |
| 4,228,133 | 10/1980 | Lindroos | 422/195 |
| 4,314,827 | 2/1982 | Leitheiser et al. | 51/298 |
| 4,457,767 | 7/1984 | Poon et al. | 51/298 |
| 4,518,397 | 5/1985 | Leitheiser et al. | 51/293 |
| 4,623,364 | 11/1986 | Cottringer et al. | 51/309 |
| 4,634,572 | 1/1987 | Lichti | 419/44 |
| 4,657,754 | 4/1987 | Bauer et al. | 423/625 |
| 4,734,104 | 3/1988 | Broberg | 51/295 |
| 4,737,163 | 4/1988 | Larkey | 51/295 |
| 4,744,802 | 5/1988 | Schwabel | 51/309 |
| 4,770,671 | 9/1988 | Monroe et al. | 51/295 |
| 4,773,920 | 9/1988 | Chasman et al. | 51/295 |
| 4,786,292 | 11/1988 | Janz et al. | 51/293 |
| 4,881,951 | 11/1989 | Wood et al. | 51/309 |
| 5,053,369 | 10/1991 | Winkler et al. | 501/152 |
| 5,139,978 | 8/1992 | Wood | 501/127 |
| 5,213,591 | 5/1993 | Celikkaya et al. | 51/309 |
| 5,215,551 | 6/1993 | Hatanaka et al. | 51/293 |
| 5,236,471 | 8/1993 | Van Dijen | 51/293 |
| 5,282,875 | 2/1994 | Wood et al. | 51/298 |

FOREIGN PATENT DOCUMENTS

| | | | |
|---|---|---|---|
| 0293164 | 11/1988 | European Pat. Off. | C04B 35/10 |
| 0291029 | 11/1988 | European Pat. Off. | C04B 35/10 |
| 0324513 | 7/1989 | European Pat. Off. | C04B 35/10 |
| 0395091 | 10/1990 | European Pat. Off. | D01F 9/08 |
| 0464850A2 | 1/1992 | European Pat. Off. | C09K 3/14 |
| 0554908A1 | 8/1993 | European Pat. Off. | C01F 7/44 |
| 0571865A1 | 12/1993 | Germany | C04B 35/10 |
| 0571866A1 | 12/1993 | Germany | C04B 35/10 |
| A120813 | 6/1918 | United Kingdom | F27B 3/00 |
| 944936 | 12/1963 | United Kingdom . | |
| A2004042 | 3/1979 | United Kingdom | F27B 1/08 |
| WO94/07969 | 4/1994 | WIPO | C09K 3/14 |

OTHER PUBLICATIONS

"Tecweigh™ Volumetric Feeders: The Inside Story," Product Brochure, Oct. 1992, Technetics Industries Inc., St. Paul, MN.
"Fire our imagination," Product Brochure, Harrop Industries, Inc., Columbus, OH, no date.
"Fuller® Flash Calcining System for dust and fines," Bulletin PR–6, Gatx–Fuller no date.
"High Temperature Fluidized Bed High Temperature Mixing Chamber," Product Brochure, Babcock Deutsche Babcock Anlagen Aktiengesellschaft no date.
"Harrop Car Shuttle Kilns," Data Sheet 8910, Harrop Industries, Inc., Columbus, OH no date.
"Harrop Car Tunnel Kilns," Data Sheet 8920, Harrop Industries, Inc., Columbus, OH no date.
"Harrop High–Temperature Electric Box Kilns," Data Sheet 8930, Harrop Industries, Inc., Columbus, OH no date.
"Harrop Osciplate™ Calciners," Product Brochure, Harrop Industries, Inc., Columbus, OH, no date.
"Harrop Pusher Plate Kilns," Data Sheet 8900, Harrop Industries, Inc., Columbus, OH no date.
"Harrop Gas–Fired Box Kilns," Data Sheet 8940, Harrop Industries, Inc., Columbus, OH no date.

*Primary Examiner*—Deborah Jones
*Attorney, Agent, or Firm*—Gary L. Griswold; Walter N. Kirn; Gregory D. Allen

[57] ABSTRACT

Alpha alumina-based abrasive grain having an as sintered outer surface. The abrasive grain can be incorporated into abrasive articles such as bonded abrasives (e.g., grinding wheels), coated abrasives, and nonwoven abrasives.

26 Claims, 6 Drawing Sheets

ALPHA ABRASIVE ALUMINA-BASED GRAIN HAVING AN AS SINTERED OUTER SURFACE

This is a continuation of application Ser. No. 08/174,431 filed Dec. 28, 1993 now abandoned.

FIELD OF THE INVENTION

This invention relates to a alpha alumina-based abrasive grain having an as sintered outer surface. The abrasive grain can be incorporated into abrasive articles such as bonded abrasives (e.g., grinding wheels), coated abrasives, and nonwoven abrasives.

DESCRIPTION OF THE RELATED ART

Abrasive particles, grains, or grits have been employed in abrasive articles for centuries. A popular or common abrasive particle during this century has been fused alumina. Fused alumina is generally formed by heating a source of aluminum oxide to a molten state and then rapidly cooling the molten material to form fused alumina. The fused alumina is then crushed and screened to provide the desired particle size distribution of abrasive material. This distribution is known in the bonded abrasive industry by a grit size and in the coated abrasive industry by a grade number.

In the early 1980's, a new type of abrasive grain was commercialized. These grains were formed by a sol gel process including a sintering step, rather than by a fusion process. Such sol gel-derived abrasive particles are disclosed, for example, in U.S. Pat. Nos. 4,314,827 and 4,518,397 (Leitheiser et al.). The sol gel method disclosed by Leitheiser et al. includes the steps of: (1) preparing a dispersion comprising of alumina monohydrate and at least one modifier precursor; (2) gelling the dispersion; (3) drying the gelled dispersion; (4) crushing the dried, gelled dispersion to form particles; (5) calcining the particles; and (6) sintering the particles, for example, in a rotary kiln, to provide abrasive grains. Leitheiser et al. teach that rapid sintering of the particles may be preferred.

Although rotary kilns are generally suitable for sintering sol gel-derived abrasive particles, such kilns are not well suited for sintering very fine or small sized abrasive particles (i.e., particles less than about 30 micrometers in size). When sintered in a rotary kiln, fine abrasive grain precursor tends to be drawn into the kiln exhaust system prior to being sintered. Alternatively, some of these small particles become deposited on and ultimately bond (or sinter) to the kiln walls and/or heating elements. Deposition of such particles on the kiln walls causes unwanted constrictions in the sintering kiln. Further, deposition on the heating elements causes degradation and premature failure of the relatively expensive heating elements.

A solution to this problem of providing sintered, fine sized abrasive grain has been to sinter abrasive grain significantly larger than the desired abrasive grain and then crush the sintered abrasive grain to provide abrasive grain of a finer size.

SUMMARY OF THE INVENTION

The present invention provides a method of making sintered abrasive grain, the method comprising the steps of:

(a) providing unsintered abrasive grain precursor;

(b) providing a sintering apparatus comprising a non-rotating kiln including wall means having inner surfaces for defining a sintering chamber, the inner surfaces including a generally planar support surface, the wall means having each of (i) a feed opening through the wall means and the inner surface affording introducing unsintered abrasive grain precursor onto the support surface in the sintering chamber, and (ii) a discharge opening through the wall means affording discharging sintered abrasive grain from the sintering chamber, a pusher plate having a pushing surface, means mounting the pusher plate on the kiln for relative movement between a first position with the pusher plate spaced from the support surface and a second position with the pushing surface adjacent the discharge opening with the pushing surface moving along the support surface during movement of the pusher plate from the first position to the second position, and means for moving the pusher plate from the first position to the second position;

(c) heating the sintering chamber to a temperature in the range from about 1000° C. to about 1600° C. (preferably, about 1200° C. to about 1500° C., more preferably, about 1350° C. to about 1450° C.);

(d) feeding a plurality of the unsintered abrasive grain precursor onto the support surface in the sintering chamber through the feed opening;

(e) allowing the unsintered abrasive grain precursor to be heated in the sintering chamber at a temperature and for a time sufficient to provide sintered abrasive grain; and (f) moving the pusher plate from the first position to the second position to move the sintered abrasive grain to the discharge opening and thereby discharge the sintered abrasive grain from the sintering chamber.

Preferably, the kiln further includes a gate adapted to close the discharge opening, and means mounting the gate on the kiln for movement between a closed position with the plate closing the discharge opening, and an open position with the gate spaced from the discharge opening.

The method according to the present invention is particularly well suited for providing sintered abrasive grain having particle sizes of less than 30, 25, 20, 15, or even 10 micrometers. Further, the unsintered abrasive grain precursor, which typically shrinks during sintering, is of a size such that when sintered, the resulting sintered abrasive grain has the desired particle size. For providing sintered abrasive grain having a particle size of less than 30 micrometers, the unsintered sintered abrasive grain precursor preferably has a particle size of less than 30, 25, 20, 15, or 10 micrometers.

During steps (d) and (e) of the method, the temperature of the sintering chamber preferably experiences a variation of less ±100° C. (i.e., the temperature of the sintering chamber is maintained within a ±100° C. range), more preferably, less than about ±50° C., and even more preferably, less than about ±25° C. Further, during steps (d), (e), and (f), the temperature of the sintering chamber preferably experiences a variation of less than ±100° C., more preferably, less than about ±50° C., and even more preferably, less than ±25° C.

In a preferred method according to the present invention, prior to moving the pusher plate from the first to the second position, the moving step further includes the additional sequential steps of:

(a) moving the pusher plate from the first position to a first intermediate position between the first portion and the second position;

(b) returning the pusher plate from the first intermediate position to a first return position at or adjacent the first position;

(c) moving the pusher plate from the first return position to a second intermediate position between the first intermediate position and the first position; and (d) returning the pusher plate from the second intermediate position to a second return position at or adjacent the first position.

In a more preferred method according to the present invention, prior to moving the pusher plate from the first to the second position, the moving step further includes the additional sequential steps of:

(a) moving the pusher plate from the first position to a first intermediate position between the first portion and the second position;

(b) returning the pusher plate from the first intermediate position to a first return position at or adjacent the first position;

(c) moving the pusher plate from the first return position to a second intermediate position between the first intermediate position and the first position;

(d) returning the pusher plate from the second intermediate position to a second return position at or adjacent the first position;

(e) moving the pusher plate from the second return position to a third intermediate position between the first portion and the second intermediate position; and (f) returning the pusher plate from the third intermediate position to a third return position at or adjacent the first position.

In this application:

"alpha alumina-based abrasive grain" refers to (sintered) abrasive grain comprising, on an elemental oxide basis, at least 50 percent by weight alumina calculated as $Al_2O_3$, wherein at least 35 percent by weight of the total amount of alumina is present as alpha alumina;

"alumina-based abrasive grain precursor" refers to abrasive grain precursor capable of being sintered to provide alpha alumina-based abrasive grain;

"alumina source" refers to the starting alumina type material present in the original dispersion or solution (e.g., alpha alumina or alpha alumina precursor (e.g., boehmite, transitional alumina, and aluminum salt (e.g., (aluminum formate and aluminum acetate))));

"abrasive grain precursor" refers to material (preferably, dried alumina-based dispersion or solution or calcined, dried alumina-based dispersion or solution) which although capable of being sintered to provide sintered abrasive grain, is porous such that it can be impregnated with an impregnating composition;

"unsintered abrasive grain precursor," which has a theoretical density of less than 80% (typically less than 60%), refers to abrasive grain precursor or partially sintered abrasive grain precursor capable of being sintered to provide sintered abrasive grain;

"impregnating composition" refers to a solution or dispersion (typically a solution) comprising liquid medium (preferably, water, more preferably, deionized water) and a metal oxide and/or precursor thereof (typically a soluble salt) which can be impregnated into abrasive grain precursor;

"abrasive grain" or "sintered abrasive grain" refers to unsintered abrasive grain precursor that has been sintered to a density at least 80% (preferably greater than about 90%, more preferably greater than about 93%, even more preferably greater than about 95%, and in some instances greater than about 97%) of theoretical;

"non-rotating kiln" refers to a kiln that does not have a sintering chamber that rotates about an axis;

"as sintered outer surface" means that the outer surface of the abrasive grain is that which results from the sintering process (i.e., the surface exposed during sintering) and which is substantially free of fracture surfaces;

"particle size" is defined by the longest dimension of a particle and can be measured by any conventional technique (e.g., for particles up to about 100 micrometers in size a particle size analyzer such as that available from Coulter under the trade designation "COULTER COUNTER, MODEL TA3" can be used);

"transitional alumina" refers to any crystallographic form of alumina which exists after heating alumina to remove any water of hydration prior to transformation to alpha alumina (e.g., eta, theta, delta, chi, iota, kappa, and gamma forms of alumina and any intermediate combinations of such forms);

"nucleating agent" refers to material that enhances the transformation of transitional alumina(s) to alpha alumina; and "nucleating material" refers to a nucleating agent or a precursor thereof.

In another aspect, the present invention provides a sintering apparatus comprising a non-rotating kiln including wall means having inner surfaces for defining a sintering chamber, the inner surfaces including a generally planar support surface, the wall means having each of (i) a feed opening through the wall means and the inner surface affording introducing unsintered particulate precursor material onto the support surface in the sintering chamber, and (ii) a discharge opening through the wall means affording discharging sintered particulate material from the sintering chamber, a pusher plate having a pushing surface, means mounting the pusher plate on the kiln for relative movement between a first position with the pusher plate spaced from the support surface and a second position with the pushing surface adjacent the discharge opening with the pushing surface moving along the support surface during movement of the pusher plate from the first position to the second position, means for moving the pusher plate from the first position to the second position; and means for heating the sintering chamber to a temperature in the range from about 1000° C. to about 1600° C. (preferably, about 1200° C. to about 1500° C., more preferably, about 1350° C. to about 1450° C.), the feed opening and the sintering chamber being arranged to afford movement of unsintered particle precursor material initially at a temperature of 25° C. (in another aspect, less than 50° C., 100° C., 200° C., 300° C., or even 400° C.) into the sintering chamber and to expose the surface of the unsintered particle precursor material entering the sintering chamber through the feed opening at an initial temperature of (in another aspect, less than 50° C., 100° C., 200° C., 300° C., or even 400° C.) to the temperature of the sintering chamber in less than 3 seconds (i.e., the feed opening and the sintering chamber being arranged such that the surface of the unsintered particle precursor material can be heated from 25° C. to the temperature of the sintering apparatus in less than 3 seconds) (preferably, less than 2 seconds, and more preferably, less than 1 second). Preferably, the discharge opening opens through the support surface. Preferably, the kiln further includes a gate, and means mounting the gate on kiln for movement between a closed position with the plate closing the discharge opening, and an open position with the gate spaced from the discharge opening.

A more preferred method for forming an alumina-based abrasive grain precursor comprises the steps of:

(a) preparing a dispersion or solution comprising liquid medium and an alumina source; and (b) converting the dispersion or solution to abrasive grain precursor.

A more preferred method for forming an alumina-based abrasive grain precursor comprises the steps of:

(a) preparing a dispersion or a solution comprising liquid medium and an alumina source;

(b) drying the dispersion or a solution to provide dried solid;

(c) optionally converting the dried solid into particles; and (e) optionally calcining the particles, to provide abrasive grain precursor. Optionally, oxide modifier material and/or other additives can be included in the dispersion or solution. Further, the abrasive grain precursor can optionally be impregnated with an impregnating composition comprising liquid medium and oxide modifier material and/or other additives.

Oxide modifier materials include iron oxide, magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, europium oxide, silicon dioxide, chromium oxide, calcium oxide, strontium oxide, precursors thereof, and combinations thereof. A preferred oxide modifier material is a combination of (a) a precursor salt of magnesium and (b) a precursor salt of a metal selected from the group of: cerium, praseodymium, samarium, ytterbium, neodymium, yttrium, lanthanum, gadolinium, dysprosium, erbium, and combinations thereof. Other oxide materials include zirconium oxide, hafnium oxide, precursors thereof, and combinations thereof.

A preferred (calcined) abrasive grain precursor, essentially free of nucleating material, is formed from a dispersion comprising liquid medium (preferably deionized water), an alumina source (preferably boehmite), and a rare earth oxide or precursor thereof (preferably a nitrate salt). Preferably, this abrasive grain precursor, which typically requires a very fast temperature rise during the very initial part of sintering to achieve the desired degree of densification, is sintered at a temperature in the range from about 1350° C. to about 1400° C.

The method according to present invention, and the use of the sintering apparatus according to the present invention, provide an effective and efficient manner to bring unsintered abrasive grain precursor to the sintering temperature at a very rapid rate. Depending upon the chemistry, this rapid temperature rise can result in a higher density abrasive grain or reduced alumina crystallite size. In general, higher density abrasive grain tends to be harder and results in a better performing abrasive grain.

The method according to the present invention of sintering abrasive grain using a (non-rotating) sintering apparatus, and the sintering apparatus according to the present invention offer several advantages over, for example, the use of a rotary kiln. The method and sintering apparatus can be used to rapidly heat unsintered abrasive grain precursor to the sintering temperature, and to effectively provide sintered abrasive grain having a particle size less than 30 micrometers, even less than 1 micrometer, without the need for post-sintering crushing or particle reduction techniques to comminute into a smaller particle size. A preferred abrasive grain made according to the method of, or with the apparatus according to, the present invention has a particle size in the range from about 1 to 25 micrometers.

Further, the use of the method and apparatus can minimize the amount of small particles which escape through the exhaust system of the kiln or sinter themselves to heating elements and/or kiln walls.

Abrasive grain prepared as described herein can be graded according to industry accepted grading standards which specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards.

In another aspect, the present invention provides a specified nominal grade of abrasive grain, the abrasive grain having a particle size distribution ranging from fine to coarse and a median (i.e., the middle value in the distribution above and below which lie an equal number of values) particle size less than 40 (30, 25, 20, 15, or even 10) micrometers, and wherein at least a portion of the abrasive grain of the specified nominal grade is a plurality of sintered, polycrystalline ceramic, alpha alumina-based abrasive grain having an as sintered outer surface. A preferred alpha alumina-based abrasive grain having an as sintered outer surface comprises:

(a) alpha alumina crystallites; and (b) aluminate platelets comprising aluminate having a magnetoplumbite crystal structure, the aluminate platelets being distributed between the alpha alumina crystallites.

The present invention also provides a specified nominal grade of abrasive grain, the abrasive grain having a particle size distribution ranging from fine to coarse and a median particle size less than 40 micrometers, wherein at least a portion of the abrasive grain of the specified nominal grade is a plurality of sintered, polycrystalline ceramic, alpha alumina-based abrasive grain having an as sintered outer surface and a particle size less than 30 micrometers.

In another aspect, the present invention provides a specified nominal grade of abrasive grain, the abrasive grain having a particle size distribution ranging from fine to coarse and a median particle size of up to 40 (30, 25, 20, 15, or even 10) micrometers, wherein at least a portion of the abrasive grain of the specified nominal grade is a plurality of sintered, crystalline ceramic, alpha alumina-based abrasive grain having an outer surface (i.e., the surface of the periphery of the abrasive grain), an outer region and an inner region (i.e., the region adjacent to the center of the abrasive grain), wherein the outer region is adjacent to the outer surface, wherein the sintered, cystalline ceramic, alpha alumina-based abrasive grain comprises:

(a) alpha alumina crystallites; and (b) aluminate platelets comprising aluminate having a magnetoplumbite crystal structure, the aluminate platelets being distributed between the alpha alumina crystallites, and wherein the outer region includes platelets that are on average larger in size than platelets in the inner region.

Preferably, at least 30 percent (preferably, 50, 75, or even 100 percent) by volume of the abrasive grain of the specified nominal grade is within 10 micrometers (i.e., ±10 micrometers) (or even 5 micrometers) of the median particle size. In another aspect, each specified nominal grade preferably includes at least 15 percent (30, 50, 75, or even 100 percent) by weight of the specified alpha alumina-based abrasive grain.

The specified nominal grade can further comprising abrasive grain other than the specified alpha alumina-based abrasive grain (e.g., fused aluminum oxide (which includes brown aluminum oxide, heat treated aluminum oxide, and white aluminum oxide), other ceramic aluminum oxide made by a sol gel process, green silicon carbide, silicon carbide, chromia, fused alumina-zirconia, diamond, ceria, cubic boron nitride, boron carbide, garnet, titanium diboride, titanium carbide, and combinations thereof). Preferably, the other abrasive grain has an average particle size less the average particle size of the abrasive gain according to the present invention.

Certain inventions described herein are claimed in copending applications having U.S. Ser. Nos. 08/173,992 and 08/174,675, each filed the same date as the present application.

DETAILED DESCRIPTION OF PREFERRED EMBODIMENTS

Figure 1:
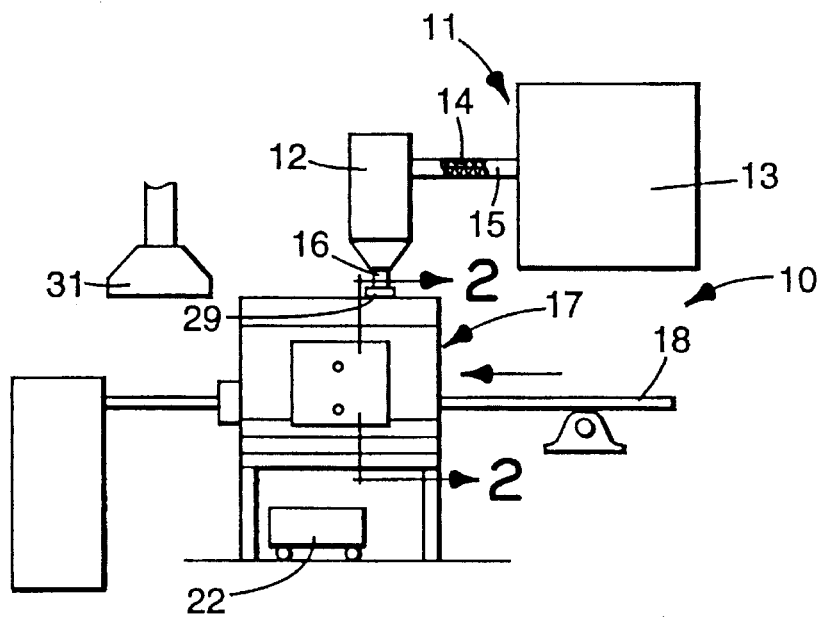
FIG. 1 is a general side view of a preferred sintering apparatus according to the present invention.

The present invention provides a method for making sintered, polycrystalline ceramic, alpha alumina-based abrasive grain.

The unsintered abrasive grain precursor material can be prepared by a number of techniques including those known in the art. Preferred methods of preparing abrasive grain precursor material include a dispersion-based sol-gel process, wherein the alumina source is preferably aluminum oxide monohydrate (boehmite) or a solution-based sol-gel process, wherein, preferably, the transition alumina precursor is an aluminum carboxylate or an aluminum nitrate.

A First Preferred Alumina-Based Dispersion

A preferred dispersion from which abrasive grain precursor is derived comprises liquid medium and alpha alumina monohydrate (boehmite). Suitable boehmite is commercially available, for example, under the trade designations "DISPERAL R" from Condea Chemie, GMBH of Hamburg, Germany and "DISPAL" from Vista Chemical Company of Houston, Tex. These commercially available aluminum oxide monohydrates are in the alpha form, are relatively pure (including relatively little, if any, hydrate phases other than monohydrates), and have a high surface area.

A variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost.

Typically, the dispersion contains at least 10% by weight deionized water, preferably between 30 to 80 percent by weight deionized water.

A peptizing agent may be added to the dispersion to produce a more stable hydrosol or colloidal dispersion. Monoprotic acids or acid compounds which may be used as the peptizing agent include acetic, hydrochloric, formic, and nitric acid.

The use of defoamers can be helpful in decreasing foaming or frothing which otherwise occurs during milling or stirring. Suitable defoamers include citric acid and its salts. A defoamer is typically used in an amount corresponding to about 1% by weight of the aluminum oxide (on a theoretical oxide basis) present in the dispersion or solution.

Further, the dispersion may include other additives such as organic binders (e.g., polyethylene glycol, commercially available, for example, under the trade designation "CARBOWAX" from Union Carbide of Akron, Ohio) and organic solvent(s) (e.g., toluene and hexane). The amounts of these materials are selected to give a desired property (e.g., ease of processing, improved drying of the solids, improved green strength, and reduced foaming).

Suitable methods for mixing the dispersion include ball milling, vibratory milling, attrition milling, and/or high shear mixing (colloid mills). High shear mixing is the preferred mixing method.

In some instances, the dispersion gels prior to the drying step. The pH of the dispersion and the concentration of ions in the dispersion are critical in determining how fast the dispersion gels. Typically, the pH is in the range of about 1.5 to 4. Further, the addition of modifier oxide material or other additive may result in the dispersion gelling.

A Second Preferred Alumina-Based Dispersion

Another preferred dispersion contains alumina material such as alpha alumina particles, particles of transitional alumina(s), or both.

A preferred alpha alumina material is commercially available under the trade designation "AKP-50" from Sumitomo Chemical of Japan.

Various transitional aluminas suitable for use in preparing the second preferred alumina-based dispersion include, but are not limited to, chi alumina, gamma alumina, eta alumina, and mixtures thereof. A suitable transitional alumina which includes chi alumina is commercially available, for example, under the trade designation "AA100W" from Alcan Corp. of Cleveland, Ohio.

It is preferred that the particulate alumina material, from which the dispersion is formed, comprise powdered material having a particle size distribution such that no more than about 0.5% by weight is greater than about 2 micrometers, and preferably such that no more than 5.0% by weight is greater than 1 micrometer in size (diameter or longest dimension). Preferably, the particle size is on the order of at least about 75% by weight smaller than about 0.7 micrometer, and, more preferably, 99% by weight is less than about 0.7 micrometer. Such particulate material typically not only readily forms the dispersion but also provides a useful precursor to the desired sintered product. Particle sizes within the preferred ranges can be obtained from commercially available materials, or can be prepared, for example, by crushing or ball milling (wet or dry) an alumina source.

A variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost.

In general, the ratio of liquid medium to powdered alumina is dependent upon the particle size distribution as it relates to the surface area of the powdered material. If water is used, generally a weight ratio within the range of about 1:6 (i.e., liquid medium to powdered raw material) to 15:1 is usable, although ratios outside of this range may also be useful. It is typically preferred to avoid the use of excess liquids in order to minimize the extent of subsequent drying. It is, however, necessary to use a sufficient amount of liquid so the thoroughly mixed dispersion can be readily handled or moved, for example, by pouring, siphoning, pumping, or extruding.

It is foreseen that if the alumina has relatively high surface area, for example, about 200–300 $m^2$/g (e.g., that commercially available under the trade designation "AA100W" from Alcan), a weight ratio of water to powder of about 5:1 to 10:1 is preferred (about 6:1 to 9:1 most preferred). If, however, the alumina has a relatively low surface area, for example, less than about 20 $m^2$/g (e.g., commercially available under the trade designation "A16" from Alcoa), a weight ratio of about 1:6 to 2:1 is preferred.

Preferably, the solids content of the dispersion is maximized, and the solids (i.e., particles) are dispersed homogeneously therein. Preferably, the size of the pores in the material dried from the dispersion is minimized. Further, it is preferred that the distribution of pore sizes is as narrow as possible.

In general, the liquid medium, dispersed alumina and other optional additives are mixed until a homogenous slurry or stable dispersion is formed. This mixture, which is sometimes referred to herein as a "stable slip," is one in which, in general, the solids of the slurry do not appear by visual inspection to begin to separate or settle upon standing for about 2 hours (due, it is believed, to the viscosity of the slurry). A stable dispersion can be obtained by thoroughly mixing the alumina, a dispersion aid, and any additional raw materials and additives into the liquid medium and reducing the size of and/or deagglomerating the particles in the dispersion until the resulting dispersion is homogeneous, and the individual alumina (powder) particles are substantially uniform in size and distribution. Suitable methods for mixing include ball milling, vibratory milling, air stirrer, Coules dissolver, attrition milling and/or high shear mixing (colloid mills). Pebble (e.g., ball, vibratory, attrition) milling techniques are generally most preferred because of their ability to readily reduce the size of the alumina starting material.

The dispersion prepared as described in this section is typically thixotropic. "Thixotropic," as used herein, is meant to describe a slurry that is viscous when under no stress, but has a low viscosity when shear (e.g., mixing) is introduced. It generally comprises a chalky or milky liquid which can be easily poured or stirred, but which is sufficiently thick so that the solids do not settle within a two-hour period. A dispersion or slip prepared according to the methods described herein generally has a consistency of about that for latex paint. Undesirable lumpy or heterogenous mixtures tend to result from inadequate mixing.

Further, dispersion aids may be used to improve the consistency or stability of the dispersion or slurry. Dispersion aids tend to help prevent or minimize settling and improve the homogenous nature of the slurry by helping to break down large agglomerates.

Preferred dispersion aids include strong acids (e.g., nitric acid) and bases (e.g., ammonium hydroxide), polyanionic polymers such as carboxylate functional polymers, (e.g., polyacrylic acids, polyacrylic acid copolymers, and polyacrylic acid salts), and basic aluminum salts such as basic aluminum chlorides and basic aluminum nitrates. Suitable carboxylate functional polymers are available, for example, under the trade designations "JONCRYL" from Johnson Wax, Inc., of Racine, Wis.; "CARBOPOL" from the B.F. Goodrich Co. of Cleveland, Ohio; "NOECRYL" from ICI Resins US of Wilmington, Mass.; and "VINAC" from Air Products and Chemicals, Inc., of Allentown, Pa.

The desired amount of dispersion aid is believed to depend on the surface area of the particles to be dispersed. Generally, the preferred amount of dispersion aid increases as the size of particles increases.

In general, for a dispersion employing strong acids or bases as dispersion aids, sufficient dispersion aid is used to render a pH of less than about 6 (preferably, about 2 to 3) or more than about 8 (preferably, about 8 to 10), respectively.

The most preferred strong acid dispersant is typically nitric acid. Dispersions employing nitric acid as the dispersant preferably contain about 2–15% by weight nitric acid, based upon total solids content of the dispersion. The stability of such dispersions may be improved by heat treating the dispersion, for example, by autoclaving it.

Dispersions employing polymeric or basic aluminum salt material as the dispersant preferably contain about 0.1 to about 4 percent by weight of such dispersant, based on the total solids content of the dispersion.

The use of defoamers can be helpful in decreasing foaming or frothing which otherwise occurs during milling or stirring. Suitable defoamers include citric acid and its salts. A defoamer is typically used in an amount corresponding to about 1% by weight of the aluminum oxide (on a theoretical oxide basis) present in the dispersion or solution.

Further, the dispersion may include other additives such as organic binders (e.g., polyethylene glycol, commercially available, for example, under the trade designation "CARBOWAX" from Union Carbide of Akron, Ohio) and organic solvent(s) (e.g., toluene and hexane). The amounts of these materials are selected to give a desired property (e.g., ease of processing, improved drying of the solids, improved green strength, and reduced foaming).

A Preferred Alumina-, Solution-Based Sol

An alumina-, solution-based sol can be prepared by techniques known in the art. Typical preparation techniques include dissolving an aluminum-based salt or complex in water; or diluting or concentrating a solution comprising an aluminum-based salt or complex. Preferably, the solution-based sol comprises in the range of about 5 to about 45 weight percent of an alpha alumina precursor. Preferably, the solution-based sol-gel comprises a soluble aluminum salt or other soluble aluminum-based complex. More preferably, the solution-based sol-gel comprises at least one of the following alpha alumina precursors: a basic aluminum carboxylate, a basic aluminum nitrate, and a partially hydrolyzed aluminum alkoxide.

Preferred solution-based sols include those comprising basic aluminum salts with carboxylate or nitrate counterions or mixtures thereof.

Preferred aluminum carboxylates are represented by the general formula, $Al(OH)_y D_{3-y}$, wherein y can range from between about 1 and about 2, preferably between about 1 and about 1.5, and D (the carboxylate counterion) is formate, acetate, propionate, oxalate, the like, and combinations thereof. Aluminum carboxylates can be prepared by techniques known in the art including the methods described in U.S. Pat. No. 3,957,598 (the disclosure of which is incorporated herein by reference), wherein aluminum metal is digested in a carboxylic acid solution and U.S. Pat. No. 4,798,814 (the disclosure of which is incorporated herein by reference), wherein aluminum metal is dissolved in a hot aqueous solution comprising formic acid and acetic acid.

Preferred basic aluminum nitrates are represented by the general formula, $Al(OH)_z(NO_3)_{3-z}$ wherein z is in the range of about 0.5 to about 2.5. The preparation of basic aluminum nitrates is known in the art and includes the methods taught in U.S. Pat. No. 3,340,205 and British Pat. No. 1,139,258 (the disclosures of which are incorporated herein by reference), wherein aluminum metal is digested in a nitric acid solution. Basic aluminum nitrates may also be prepared according to U.S. Pat. No. 2,127,504 (the disclosure of which is incorporated herein by reference), wherein aluminum nitrate is thermally decomposed.

It is within the scope of the present invention to prepare abrasive grain precursor from a dispersion prepared by adding aluminum salts to a dispersion of alpha alumina and/or alpha alumina precursor, or by mixing a dispersion of alpha alumina and/or alpha alumina precursor with an alumina-, solution-based sol.

Drying The Dispersion or Solution

In general, minimizing or reducing the amount of air or gasses entrapped in the dispersion or solution before drying (deliquifying) tends to decrease the probability of frothing. Less entrapped gasses generally can be correlated with a less porous microstructure, which is desirable. Degassing may be conducted, for example, by subjecting the dispersion or solution to a vacuum, with a draw on the order of about 130 cm Hg (25 psi).

Drying can be performed by any conventional means, preferably by heating. Once sufficient water has been removed from the alumina dispersion or solution, the partially dried plastic mass may be shaped by any convenient method such as pressing, molding or extrusion and then carefully dried to produce the desired shape such as a rod, pyramid, diamond, or cone (see section below entitled "Optional Shaping of the Dispersion or Solution"). Further, irregularly shaped abrasive grain precursor is conveniently formed by simply depositing the dispersion or solution in any convenient size of drying vessel such as one in the shape of a cake pan and drying, usually at a temperature below the frothing temperature of the dispersion or solution. Drying may also be accomplished by simply air drying or using any of several other dewatering methods that are known in the art to remove the free water of the dispersion or solution to form a solid, including pulling a vacuum over the dispersion or solution.

Drying can also be accomplished in a forced air oven at a temperature in the range of 50° to 200° C., preferably between 100° to 150° C. This heating can be done on a batch basis or on a continuous basis. This drying step generally removes a significant portion of the liquid medium from the dispersion or solution, however generally there may be still a minor portion of the liquid medium present in the dried solid.

Optional Shaping of the Dispersion or Solution

If rendered sufficiently thick or partially dry, the dispersion or solution can be shaped by conventional means such as pressing, molding, coating, extrusion, cutting, or some combination of these steps, prior to drying, to a grit precursor form. It can be done in stages, for example, by first forming a plastic mass of partially dried slurry through extrusion, then shaping the resulting plastic mass by any convenient method, and finally drying to produce a desired shape, for example, a rod, pyramid, disc, diamond, triangle, or cone.

If the abrasive grain precursor is shaped into a rod, the aspect ratio of the rod should be at least about 0.5 to 1, typically 1 to 1, preferably at least 2:1, more preferably at least 4:1, and most preferably at least 5:1. The cross section of the rod can be circular, rectangular, triangular, hexagonal, or the like. The rods can be made in a manner as described, for example, in U.S. Pat. No. 5,090,968 (Pellow), the disclosure of which is incorporated herein by reference for its teaching of how to make rods. Another preferred shape is a thin body having triangular, rectangular, circular, or other geometric shape. Such thin abrasive bodies have a front face and a back face, both of which have substantially the same geometric shape. The faces are separated by the thickness of the particle. The ratio of the length of the shortest facial dimension of such an abrasive particle to its thickness is at least 1:1, preferably at least 2:1, more preferably at least 5:1, and most preferably at least 6:1. A method for making such thin shaped abrasive grain is described in U.S. Pat. No. 5,201,916 (Berg et al.), the disclosure of which is incorporated herein by reference for its teaching thereto.

Conversion of the Dried Solid into Dried Solid Particles

The dried solid is converted into dried solid particles usually by crushing. It is much easier and requires significantly less energy to crush a dried solid in comparison to a sintered, densified abrasive grain. This crushing step can be done by any suitable means such as hammer mill, roll crushing, or ball mill to form the dried solid particles. Any method for comminuting the solid can be used and the term "crushing" is used to include all of such methods. If the dried solid is shaped to a desired dimension and form, then the conversion step occurs during the shaping process. Thus, a shaped abrasive grain precursor need not be crushed after drying because a dried solid particle is already formed.

Calcining

The dried solid particle may optionally be calcined. Typically, the dried material is calcined prior to sintering. During calcining, essentially all of the volatiles and organic additives are removed from the precursor by heating to a temperature in the range from about 400° C. to about 1200° C. (preferably, about 500° C. to about 800° C.). Material is held within this temperature range until the free water and preferably 90 wt-% of any bound volatiles are removed. Calcining can be conducted before optional impregnation steps, after optional impregnation steps, or both. In general, preferred processing involves calcining immediately prior to or as a last step before sintering.

Oxide Modifier Materials, Nucleating Materials, And Other Additives To The Dispersion Or Solution Oxide modifier materials, nucleating materials, and other additives can be added to the dispersion or solution, and/or impregnated into abrasive grain precursor (i.e., dried or calcined dispersion or solution).

Oxide modifier material can be included in the abrasive grain precursor by incorporation, for example, into the alumina-based dispersion or solution. Such introduction may include adding particles or a sol of the modifier or additive directly to a dispersion or solution. Preferably, such particles or particles making up the sol have an average particle size less than 1 micrometer. Suitable precursors of the oxide modifiers and other oxide additives include hydrous forms or salts. A variety of such precursors may be used including nitrates, sulfates, acetates, and chlorides.

Preferably, a sufficient amount of oxide modifier material and/or oxide additive is incorporated into the abrasive grain precursor such that the sintered abrasive grain includes up to about 15 percent (more preferably, up to about 10 percent, even more preferably, in the range from about 1 to about 8 percent) by weight one or more oxides of iron, magnesium, manganese, zinc, cobalt, titanium, nickel, yttrium, praseodymium, samarium, ytterbium, neodymium, lanthanum, gadolinium, dysprosium, erbium, cerium, europium, calcium, strontium, zirconium, hafnium, chromium, silicon, and combinations thereof (calculated on a theoretical oxide basis as $Fe_2O_3$, $MgO$, $MnO$, $ZnO$, $CoO$, $TiO_2$, $NiO$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Ce_2O_3$, $Eu_2O_3$, $CaO$, $SrO$, $Zr_2O_3$, $HfO_2$, $Cr_2O_3$, and $SiO_2$, respectively).

Suitable ceria sols for adding to a dispersion or a solution are described, for example, in the Assignee's co-pending application having U.S. Ser. No. 07/951,443 (Larmie), filed Sep. 25, 1992, the disclosure of which is incorporated herein by reference.

Metal oxide and/or silica can react with the alumina to form a reaction product or the metal oxide can remain as the metal oxide. For example the oxides of cobalt, nickel, zinc and magnesium react with alumina to form spinels, whereas zirconia and hafnia do not react with the alumina.

Alternatively, the oxide of the reaction product of dysprosium and gadolinium with alumina will generally be a garnet. The oxide of the reaction product of praseodymium, ytterbium, erbium and samarium with alumina will generally be perovskite which may include garnet. Yttria can react with the alumina to form a garnet structure, $Y_3Al_5O_{12}$.

It is specifically noted that certain rare earth oxides and divalent metal cations react with alumina during sintering to form hexagonal rare earth aluminates represented by the formula:

$$LnMAl_{11}O_{19},$$

wherein:

Ln is a lanthanide rare earth such as $La^{3+}$, $Nd^{3+}$, $Ce^{3+}$, $Pr^{3+}$, $Sm^{3+}$, $Gd^{3+}$, or $Eu^{3+}$; and M is a divalent metal cation such as $Mg^{2+}$, $Mn^{2+}$, $Zn^{2+}$, $Ni^{2+}$, or $Co^{2+}$.

Such hexagonal rare earth aluminates are typically referred to as magnetoplumbites. Magnetoplumbites generally form as platelets in the microstructure of the resulting sintered material. These platelets typically have a length of about 0.5–3 micrometers and a thickness of about 0.05–0.1 micrometer. Such platelets are typically associated with such characteristics as improved toughness. Generally, provision of at least about 1% (preferably, about 3% to about 5%), on a theoretical basis, of reactants to provide magnetoplumbite in the final sintered abrasive grain, is preferred.

Another hexagonal rare earth aluminate that can form during sintering is represented by the formula:

$$Ca_{1-x}Ln_xAl_{12-x}O_{19-x},$$

wherein:

Ln is a lanthanide rare earth such as $La^{3+}$, $Nd^{3+}$, $Ce^{3+}$, $Pr^{3+}$, $Sm^{3+}$, $Gd^{3+}$, or $Eu^{3+}$; and x can range from 0 to 1.

In a preferred embodiment the size of the platelets in the outer region of the abrasive grain are on average larger than platelets in the inner region of the abrasive grain.

For dispersions or solutions including alpha alumina precursors, nucleating materials (e.g., alpha iron oxide, chromium oxide, precursors thereof, and alpha alumina) can be added thereto.

Other adjuvant(s) or modifier(s) which can be added to the dispersion and/or impregnated in the abrasive grain precursor include zirconium oxide, chromium oxide, hafnium oxide, precursors thereof, and combinations thereof. Such materials may be incorporated into the final sintered ceramic abrasive grain, for example, for one or more of the following reasons: to increase the hardness of the resulting ceramic, to increase the toughness of the resulting ceramic, to increase the density of the resulting ceramic, and/or to modify crystal structure (and thus grinding performance).

Suitable zirconia sols for adding to a dispersion or solution are described, for example, in the Assignee's co-pending application having U.S. Ser. No. 07/951,654 (Larmie), filed Sep. 25, 1992, the disclosure of which is incorporated herein by reference.

Suitable precursors of the adjuvant(s) or modifier(s) include hydrous forms or salts. A variety of such precursors may be used including nitrates, sulfates, acetates, and chlorides.

For additional details regard the preparation of abrasive grain precursors see U.S. Pat. No. 4,314,827 (Leitheiser et al.), U.S. Pat. No. 4,770,671 (Monroe et al.), U.S. Pat. No. 4,744,802 (Schwabel), and U.S. Pat. No. 4,881,951 (Wood et al.), and copending applications having U.S. Ser. No. 07/951,654 (Larmie; filed Sep. 25, 1992), U.S. Ser. No. 07/951,443 (Larmie; filed Sep. 25, 1992), U.S. Ser. No. 07/951,671 (Larmie; filed Sep. 25, 1992), and U.S. Ser. No. 08/151,540 (Monroe et al.; filed Nov. 12, 1993), the disclosures of which are incorporated herein by reference.

For additional details regard the use of nucleating materials see U.S. Pat. No. 4,623,364 (Cottringer et al.), U.S. Pat. No. 4,744,802 (Schwabel), U.S. Pat. No. 4,964,883 (Morris et al.), U.S. Pat. No. 5,139,978 (Wood), and U.S. Pat. No. 5,219,806 (Wood), the disclosures of which are incorporated herein reference.

Impregnation and Surface Coating of the Abrasive Grain Precursor with Oxide Modifier Material, Nucleating Material, and Optional Adjuvants or Modifiers Oxide modifier and optional adjuvants or modifiers (such as referenced above) can be incorporated into the grit material after drying, typically after the follow-up step of calcining. Precursors of various metal oxides, for example, can be incorporated by impregnation into the abrasive grain precursor. Calcined material derived from boehmite, for example, typically contains pores about 30–40 Angstrom in radius. This impregnation can be accomplished, for example, by mixing a liquid solution containing metal oxide precursor (e.g., salts) with abrasive grain precursor material. Generally, about 15 ml or more of liquid carrier with the metal oxide precursor dissolved therein is mixed with each 100 grams of abrasive grain precursor material. The preferred volume of liquid carrier with the metal oxide precursor dissolved therein is dependent on the pore volume of the abrasive grain precursor material. The preferred ratio of liquid carrier with the metal oxide precursor dissolved therein per 100 grams of abrasive grain precursor material is typically within a 15 to 70 ml per 100 gram range. Preferably, all of the dissolved oxide precursor impregnates the abrasive grain precursor material. In general, when this method is utilized to incorporate modifier precursor into the grits, the modifier is preferentially portioned toward outer parts of the abrasive grain. A more uniform distribution can, in many instances, be obtained by mixing the nonsoluble modifier or modifier precursor into the initially formed dispersion.

Impregnation can be conducted directly on the dried grits from the dispersion or solution, after crushing, for example, if the liquid medium utilized is one which will not dissolve or soften the grit material. For example, if the liquid medium used for the dispersion or solution is water, a non-polar organic solvent can be used as the liquid medium for the impregnating solution for the impregnation of dried grits. Alternatively, especially if the grit material is calcined prior to the impregnation step, water can be, and preferably, is used as the carrier.

For further details regarding impregnation of the porous abrasive grain precursor, see U.S. Pat. No. 5,164,348 (Wood), the disclosure of which is incorporated herein by reference.

After impregnation, the impregnated particles are dried such that the particles do not stick together or adhere to the feed tube of the calciner. In some instances, this drying step is not necessary. Next, the particles are calcined to remove bound volatile materials. Calcining is usually accomplished at a temperature of between about 400° to 1000° C., preferably between 500° to 800° C. The conditions for this calcination are essentially described above in the section entitled "Calcining." It is within the scope of this invention however, the first and second calcination processing conditions be different.

Further, it is within the scope of this invention to utilize more than one impregnation step. Multiple impregnation steps can increase the concentration in the porous structure of the metal oxide being carried in the impregnation solution. The subsequent impregnation solution may also have a different concentration of solids and/or a combination of different materials. For example, the first solution may contain one metal salt and the second solution may contain a different one. Additional information concerning impregnation can be found in U.S. Pat. No. 5,139,978 (Wood), the disclosure of which is incorporated herein reference.

Further, alumina precursors such as boehmite, soluble aluminum salts (e.g., basic aluminum carboxylates, basic aluminum nitrates, basic aluminum chlorides, partially hydrolyzed aluminum alkoxides, and combinations thereof), and combinations thereof can also be impregnated in the abrasive grain precursor.

It is also within the scope of this invention to incorporate inorganic particles in the impregnation solution to provide an impregnation dispersion. Such inorganic particles are less than about 20 micrometers in size, typically less than about 10 micrometers, preferably less than about 5 micrometers, and may be less than about 1 micrometer. During impregnation, inorganic particles that are too large to penetrate into the pores of the calcined abrasive grain precursor remain on the surface of the abrasive grain precursor. During sintering, these inorganic particles autogeneously bond to the surface of the abrasive grain providing an increased surface area. This procedure and the resulting coating are further described in U.S. Pat. No. 5,213,951 (Celikkaya et al.), incorporated herein by reference.

Another method to create a surface coating on abrasive grain according to the present invention is to bring inorganic protuberance masses (typically less than about 25 micrometers in size) in contact with the larger dried abrasive grain precursor particles or calcined abrasive grain precursor particles. Then during sintering, the small inorganic protuberance masses autogenously bond to the surface of the abrasive grain. This process and the resulting abrasive grain are further described in U.S. Pat. No. 5,011,508 (Wald et al.), the disclosure of which is incorporated herein by reference.

Sintering Apparatus

A general schematic of a preferred sintering apparatus according to the present invention is shown in FIG. 1. Sintering apparatus 10 includes feed system 11 for introducing abrasive grain precursor (not shown) into kiln 17. Feed system 11 includes hopper 12 and feeder 13. Traversing means 14 moves abrasive grain precursor material from feeder 13 into and through trough 15. The abrasive grain precursor travels through trough 15 to hopper 12 which in turn leads to feed tube 16 which in turn leads to kiln 17. Abrasive grain precursor collects in sintering chamber 19 (shown in FIGS. 2 and 3). Preferably, pusher plate 18 at a selected interval pushes the plurality or mound of abrasive grain precursor flat. After sintering, pusher plate 18 pushes the sintered abrasive grain out of kiln 17 through exit tube 21 (shown in FIG. 3). The sintered abrasive grain is then collected in collection hopper 22. Conventional exhaust system 31 removes kiln exhaust gases and fine sized particles that may escape from the sintering apparatus.

Although abrasive grain precursor can be directly or manually feed directly into the kiln, a feed system (typically a feeder, hopper, and/or transversing means)is preferred. Preferably, the feed system allows for automated feeding and typically more uniform feeding of unsintered abrasive grain precursor into the kiln or sintering chamber.

Suitable traversing means include any conventional means known in the art for such use, including a conveyer, auger, screw feeder, or vibratory feeder. The transversing means preferably aids in providing a uniform and predetermined flow of abrasive grain precursor to the sintering chamber. Further, to aid in providing a consistently sintered product, it is preferred that a uniform, predetermined amount of abrasive grain precursor be fed into the sintering chamber. For example, a conveyer employing scoops may be used to feed premeasured amounts of unsintered abrasive grain precursor at selected intervals.

Although feed system 11 is shown to include a feeder and a hopper, it is within the scope of the present invention to use a feed system which consists of only a feeder. Further, abrasive grain precursor can be continuously or batch fed into a hopper by any conventional means such as gravity feeding, vibratory feeding, pump feeding, pneumatic feeding, and dump feeding (i.e., a feeder utilizing a dump valve).

Suitable feeders or feed systems are commercially available. For example, a preferred feed system is available under the trade designation "TECWEIGH VOLUMETRIC FEEDER" from Technetics Industries Inc. of St. Paul, Minn. The specifics of the most preferred feeder, hopper, or feed system depend, for example, on the specifics of the other components of the sintering apparatus, the sintering times and temperatures, the abrasive grain precursor composition, and the desired output.

Features to consider in selecting a feeder include the feeder walls, which can be tapered or straight, the capacity of the feeder, the feeder flow rate, and whether the feeder includes a lid. The latter minimizes unwanted contamination into the feeder and escape of fine sized abrasive grain precursor. To facilitate flow of material through the feeder, the walls are typically tapered.

Further, the feeder preferably includes a plurality of movable blades for agitating or scraping which continuously, or at regular intervals, agitate the abrasive grain precursor and scrape the walls of the hopper to loosen any attached precursor material as well as to aid in providing a continuous flow of material from the hopper to the traversing means. The rotation rate of the movable blades for agitating or scrappering, which can be controlled by a motor located such that it is not in contact with the abrasive grain precursor, depends on the desired feed rate of the abrasive grain precursor.

The hopper can be any suitable hopper known in the art for such use, including, a hopper defined by a bottom and side walls or a bag.

A preferred hopper has four tapered walls that taper inward toward the discharge opening to increase and ease the flow of abrasive grain precursor from the hopper to the feed tube. The use of tapered walls also tends to minimize attachment of abrasive grain precursor to the hopper walls.

Components of the feed system are made of materials suitable for the environment in which they are used. For example, the structural components and walls are preferably made of a metal such as cold rolled steel, galvanized steel or stainless steel. The movable blades for agitating or scrappering are preferably made of stainless steel.

Further, the inside walls of the feeder (i.e., the walls exposed to the abrasive grain precursor) are preferably lined or coated with a tough polymeric material (e.g., polyurethane, vinyl, or polyester), to assist in the flow of abrasive grain precursor, as well as to minimize attachment of abrasive grain precursor to the walls.

A significant function of the transversing means (e.g., an auger or a screw feeder) is to provide a uniform and consistent flow of abrasive grain precursor into the kiln. The length of the traversing means is preferably such that if the feed source of abrasive grain precursor ran dry (i.e., without abrasive grain precursor), there is sufficient distance between the kiln and the feed system to avoid heat damage to the feed system.

The traversing means, which is typically powered by an external motor, is preferably an auger comprised of a solid cylindrical rod on which rotates protruding helical pitches. The dimensions and angles of the pitches affect the flow rate of abrasive grain precursor. Further, the dimensions of the auger are typically selected to limit or prevent excessive heat build up in the feed system. The auger, which because of its relatively close proximity to the kiln, is made of a durable, heat resistant material such as stainless steel.

The dimensions of the feeding trough depend, for example, on the feed rate of abrasive grain precursor into the kiln and size of the sintering chamber. Due to its relatively close proximity to the kiln, the feeding trough is made of a durable, heat resistant material such as stainless steel.

It is within the scope of the present invention to have unsintered abrasive grain precursor exit a drier or calciner and then feed directly into the kiln or enter a feed system.

The abrasive grain precursor is preferably gravity fed from feeding trough 15 into hopper 12 to feed tube 16. Referring to FIG. 1 feed tube 16 is connected to hopper 12 by means of collar 29. Feed tube 16, and protrudes into the kiln with minimal (preferably without) gaps between feed tube 16 and the kiln. The presence of such gaps tends to allow undesirable formation of abrasive grain precursor therein and escape of heat from the sintering chamber.

The feed tube is made of a heat resistant, material such as mullite, alumina, silicon carbide, or silica. The inner diameter of the feed tube, which affects the flow rate of abrasive grain precursor therethrough, is typically greater than about 1.5 centimeters, preferably greater than about 2 centimeters. Further, the length of the feed tube is preferably at least about 38 cm (15 inches), more preferably at least about 45.5 cm (18 inches). The feed tube is preferably configured to minimize excessive heat transfer from the kiln to the transversing means, feeder, or hopper.

Although it is within the scope of the present invention to employ more than one feed tube, one feed tube is generally preferred in order to minimize heat loss from the sintering chamber as well as to minimize clogging inside of the feed tube. If more than one feed tube is used, the additional feed tube(s) is typically feed from a single feeding trough.

Figure 2:
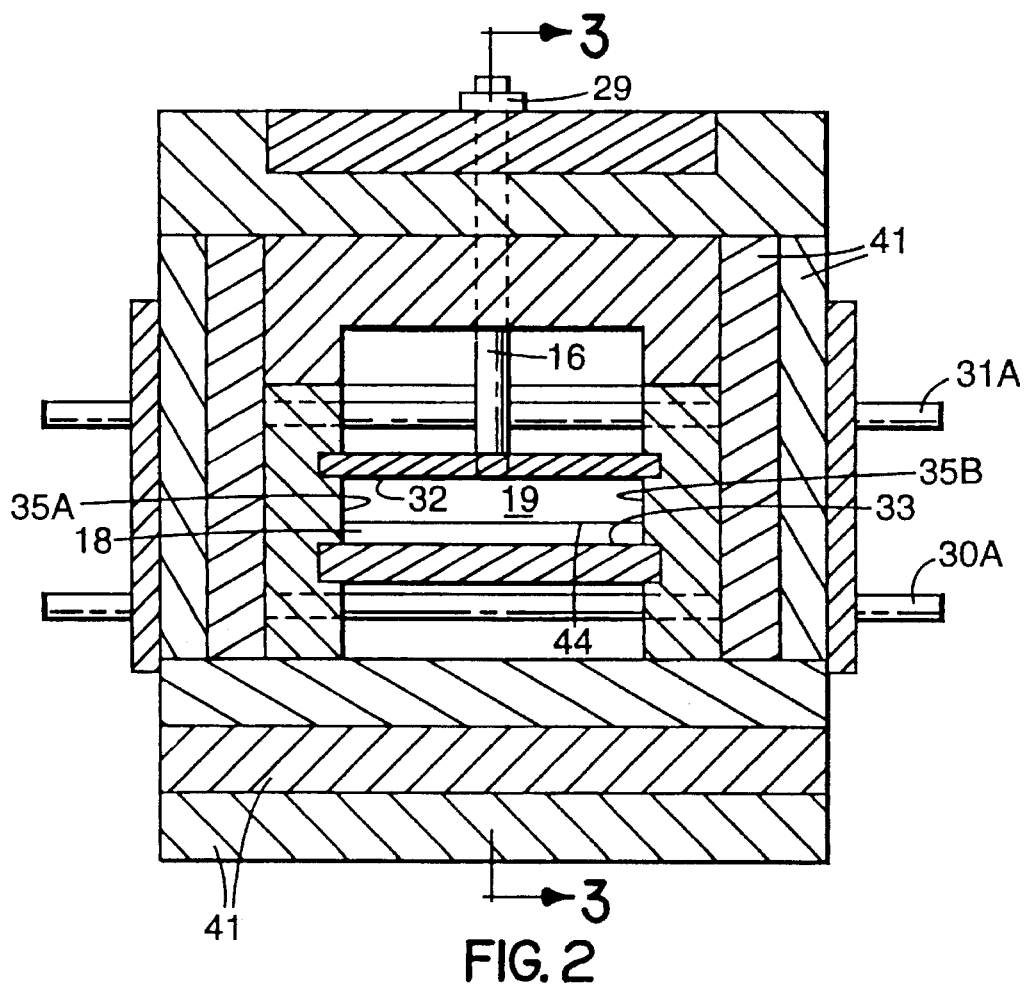
FIGS. 2–3 are schematic cross-sectional views of a sintering apparatus according to the present invention.
Figure 3:
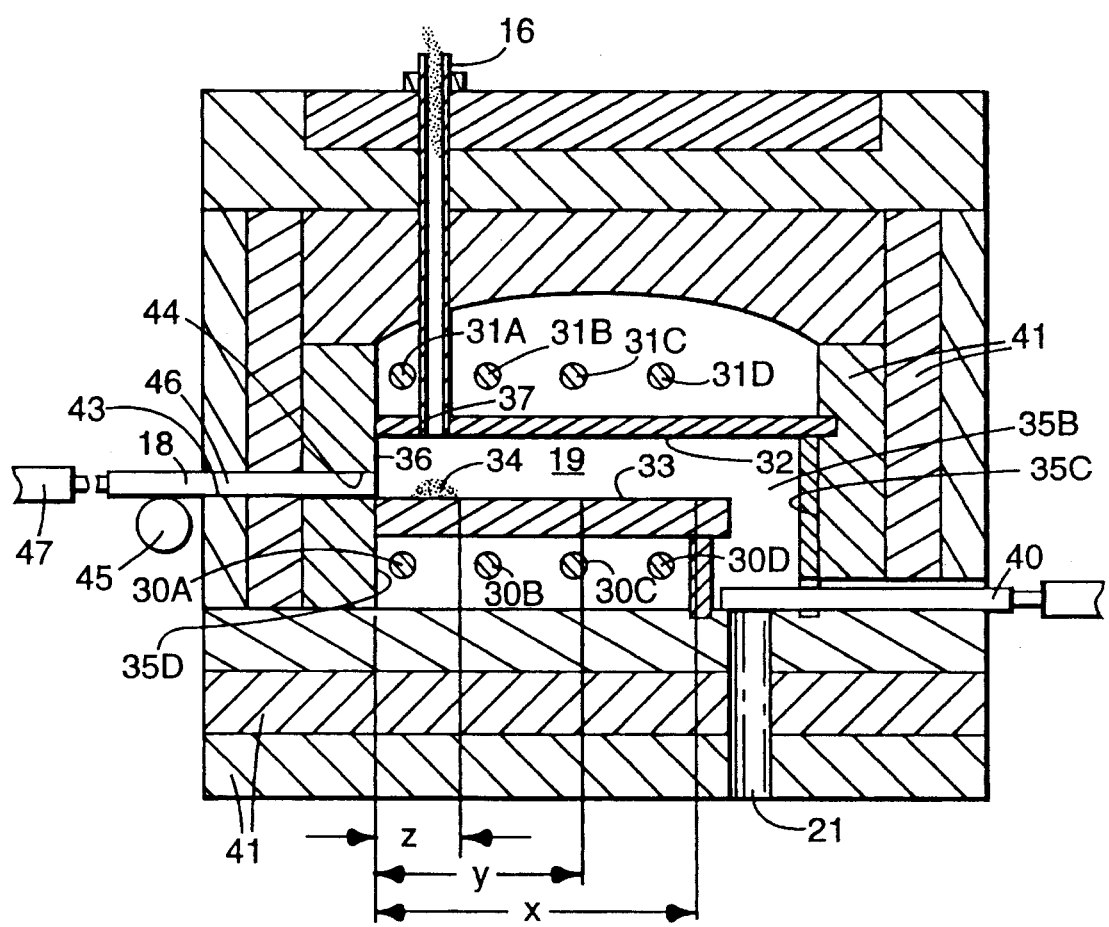

Referring to FIGS. 2 and 3 sintering chamber 19 includes walls 35A, 35B, 35C, and 35D, ceiling 32, and floor 33. Ceiling 32 has opening 37 through which feed tube 16 passes. Abrasive grain precursor is fed into sintering chamber 19 onto floor 33. The walls, ceiling, and floor forming the sintering chamber are made of suitable conventional refractory material capable of withstand the operating temperatures of the kiln. They are preferably made from silicon carbide.

Located above ceiling 32 and below floor 33 are heating elements 31A, 31B, 31C, and 31D; and 30A, 30B, 30C, and 30D, respectively. Further, kiln 17 includes refractory material 41. The number and location of heating elements are selected and arranged to ensure a fast, uniform heat transfer. The heating elements can be powered by an electrical source. The preferred heating source is electricity. Suitable electrical heating elements include those known in the ceramic art for conventional kilns (e.g., silicon carbide heating elements or molydisilicide heating elements). Alternatively, the kiln can be heated by natural gas burners.

Preferably, precursor material entering the sintering chamber passes near at least one heating element (more preferably, between two heating elements, even more preferably, between two heating elements equally space from the path of the unsintered material entering the sintering chamber) to aid in rapid heating thereof.

Although precursor material is shown to enter through the ceiling of the sintering chamber, it is within the scope of the present invention to introduce the precursor material through a side wall or the floor. For example, precursor material can be introduced through the floor using a piston.

The heating elements operate at a temperature sufficient to provide the sintering chamber with the proper sintering temperature, which is typically in the range from 1000° to 1600° C. (preferably about 1200° to 1500° C., more preferably about 1350° to 1450° C.). The sintering chamber is typically designed to minimize heat loss through the wall means.

Suitable kiln refractory material is known in the art and includes those available under the trade designation "G-20," "G-23," "R-8023," R-8024," (which each have compositions of 54–59 percent by weight $SiO_2$, 33–40 percent by weight $Al_2O_3$, 1–2 percent by weight $Fe_2O_3$, 1–2 percent by weight $Na_2O/K_2O$) and GREENLITE-28" from A.P. Green Refractories Co. of Mexico, Mo.

The abrasive grain precursor is fed through feed tube 16 into sintering chamber 19, which is usually heated at or near the sintering temperature. The feed tube, and thus the abrasive grain precursor, pass directly between two adjacent heating elements and onto floor 33, resulting in a very rapid heat up rate for the individual abrasive grain precursor particles. The resulting rapid sintering, depending upon the chemistry of the abrasive grain precursor, can result in a very dense ceramic body that has very small alpha alumina crystallites.

When the abrasive grain precursor is fed into the sintering chamber 19 and retained on floor 33, mound 34 is formed. Mound 34 is generally undesirable because it leads to inconsistent or nonuniform heating of the abrasive grain precursor. To improve the uniformity of abrasive grain precursor on floor 33, pusher plate 18 is actuated to level mound 34. Preferably, the height of levelled mound 34, after sintering, is less than 1.4 cm (0.5 inch), more preferably less than 1 cm (0.375 inch), and most preferably less than 0.7 cm (0.25 inch). This relatively shallow bed height tends to aid in providing consistent heat transfer to individual unsintered abrasive grain precursor, and in consistently providing uniformly sintered abrasive grain.

Abrasive grain precursor can be continuously fed into sintering chamber 19, resulting in a portion of the abrasive grain precursor lying on top of pusher plate 18. Pusher plate 18 passes through opening 43 and 44 in wall 35D. The distance between pusher plate 18 and opening 44 is very small and any residual abrasive grain precursor on top of the pusher plate will be scrapped off as the pusher plate 18 exits kiln 17. Alternatively, abrasive grain precursor can be intermittently fed into the sintering chamber.

Pusher plate 18 is typically hydraulically actuated. Roller 45 prevents pusher plate 18 from sagging or warping. During sintering, pusher plate 18 is preferably cycled in sintering chamber 19 as follows. In the first part of the cycle pusher plate 18 pushes the abrasive grain precursor (and/or sintered abrasive grain) a distance x. In the second part of the cycle pusher plate 18 pushes the abrasive grain precursor (and/or sintered abrasive grain) a distance y, and in the third, a distance z. Distances x, y, and z are measured from point 36. The distances selected are dependent on the configuration of the sintering chamber, and the location of the feed and discharge openings. Further, distance x is greater than distance y, which is greater than distance z. In one embodiment, for example, the distances x, y, and z, are 40.6 cm, 33 cm, and 25 cm, respectively.

Preferably, the feeding of the unsintered abrasive grain precursor is synchronized with the movements of the pusher plate such that when the pusher plate is positioned over the portion of the support surface on which the unsintered abrasive grain precursor is fed, no precursor material is fed into the sintering chamber.

There is a time delay, on the order of seconds, for these different parts of a given cycle. After the third part of the cycle, pusher plate 18 is fully retracted and the abrasive grain precursor remains in sintering chamber 19 for a time sufficient to sinter the abrasive grain precursor. After the desired level of sintering is achieved, pusher plate 18 moves and gate 40 opens such that the sintered abrasive grain discharges from sintering chamber 19 into exit tube 21. After one cycle is completed, there is a time delay, typically on the order of minutes, and another cycle is started. The times associated with these cycles are determined for a given sintering process and are a function, for example, of the kiln operating temperature, the desired densification, the desired output rates, and the chemistry of the abrasive grain precursor. For the sintering of abrasive grain having a theoretical composition of 95.2 percent by weight $Al_2O_3$, 1.2 percent by weight $La_2O_3$, 1.2 percent by weight $Nd_2O_3$, 1.2 percent by weight $Y_2O_3$, and 1.2 percent by weight MgO, a preferred sintering temperature is about 1415° C. and is sintered for about 3.4 minutes.

Although the above description of the operation of the sintering apparatus included three parts to the sintering cycle, it is within the scope of the invention to use one, two, or more than three of such parts for a cycle.

Gate 40, which is typically hydraulically actuated, minimizes heat loss from sintering chamber 19. The gate is made from a heat resistant, refractory material such as silicon carbide.

The pusher plate is made of a material(s) suitable for the environment in which it is used. Preferably, the pusher plate comprises two segments. Referring to FIG. 3, first segment 46, which enters kiln 17, is made, for example of a metal such as inconnel steel. Second segment 47 can be made, for example, of stainless steel. The two segments can be joined together, for example, by welding. The thickness of the pusher plate is dependent on the particular parameters of the sintering apparatus, but is preferably about 2.5 cm (1 inch).

Although the pusher plate is shown in FIG. 2 to have a single pushing surface, the plate may, depending on the sintering chamber configuration, include more than one pushing surface. For example, a pusher plate having a "V" shape would have two pushing surfaces.

Figure 8:
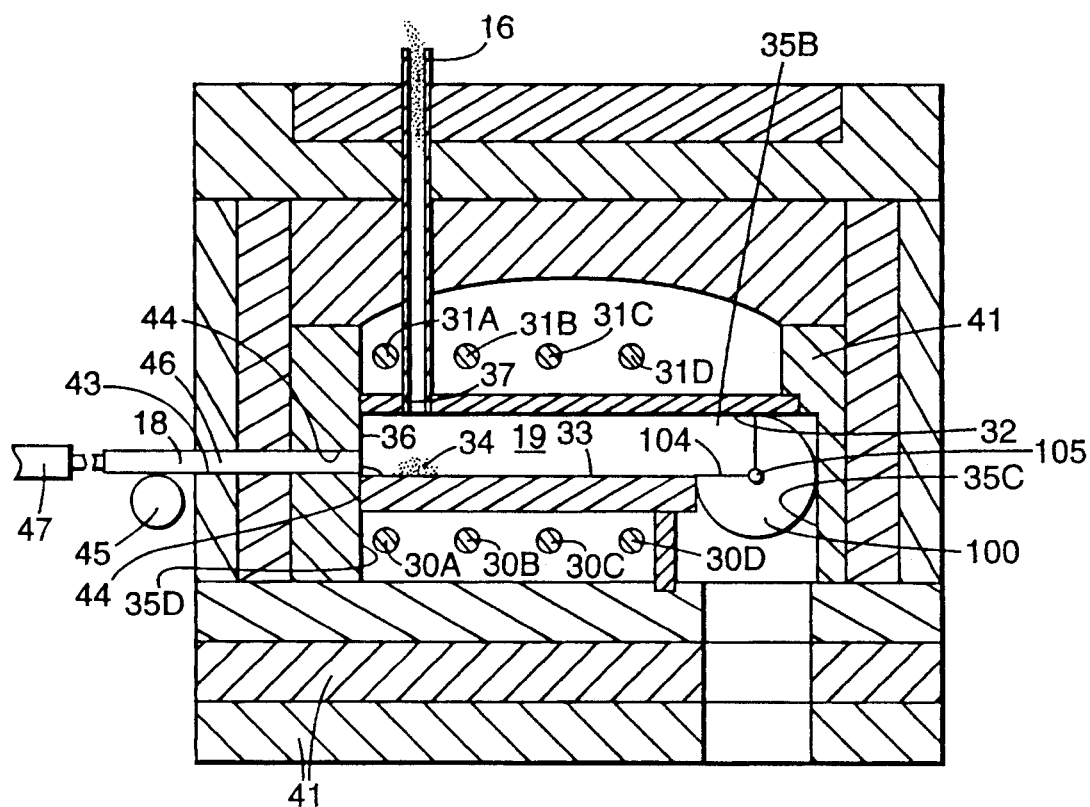
FIGS. 8–10 are schematic cross-sectional views of a sintering apparatuses according to the present invention.
Figure 9:
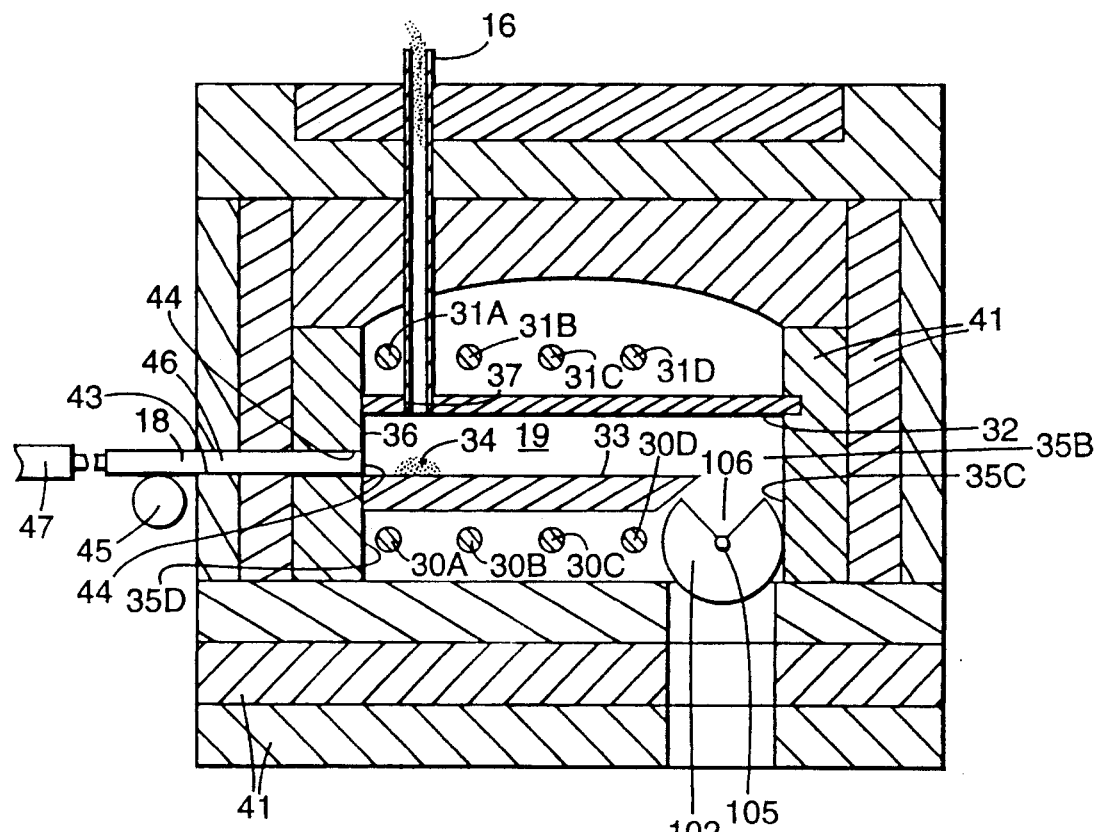
Figure 10:
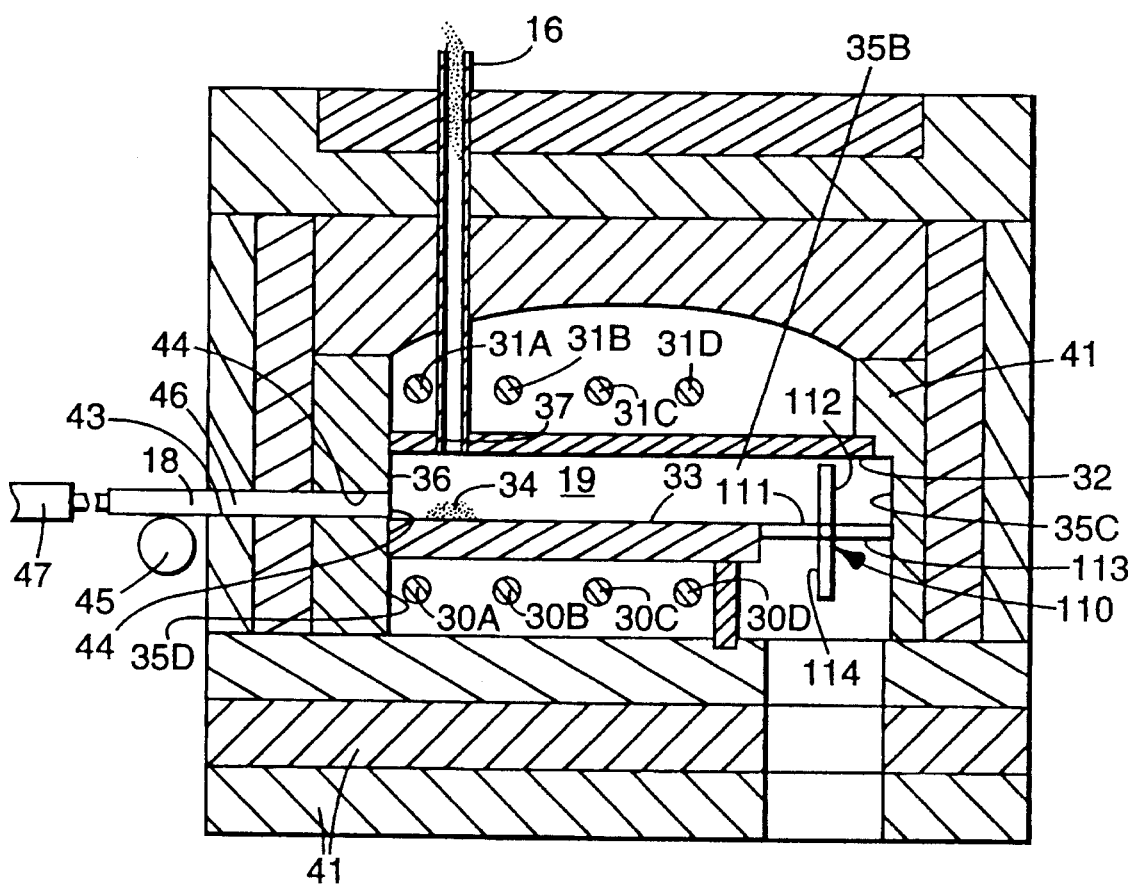

Referring to FIGS. 8, 9, and 10, particulate transport means 100, 102, and 110, respectfully, are alternative means for removing sintered particulate from the abrasive chamber. Referring to FIG. 8, sintering particulate is place onto surface 104 of cylindrical body 100. Cylindrical body 100 rotates about axis 105 and dumps sintered particulate into discharge opening or exit tube 21. Referring to FIG. 9, sintering particulate is place into wedge-shaped cavity 106 of cylindrical body 102. Cylindrical body 102 rotates about axis 107 and dumps sintered particulate into discharge opening or exit tube 21. Referring to FIG. 10, sintering particulate is place onto surfaces 111, 112, 113, or 114, of cylindrical body 110. Rotatable body 110 rotates about axis 115 and dumps sintered particulate into discharge opening or exit tube 21. Such transport means can be made of suitable refractory materials including platinum and platinum/rhodium.

Sintering

The unsintered abrasive grain precursor is typically sintered at a temperature in the range from about 1000° to about 1600° C. (preferably, about 1200° C. to about 1500° C., more preferably, about 1300° C. to about 1425° C.).

Although the length of time to which the materials should be exposed to sintering temperatures varies depending on factors such as the particle size of the unsintered abrasive grain precursor, the composition of the unsintered abrasive grain precursor, and the sintering temperature, generally sintering can be and should be accomplished within a few seconds to about 120 minutes (typically 1–10 minutes). Shorter sintering times and lower sintering temperatures generally are preferred to inhibit excess grain growth and to obtain preferred microstructures.

Sintering is typically conducted in an oxidizing atmosphere (typically air), at atmospheric pressure. It is within the scope of the present invention, however, to modify the sintering apparatus to allow sintering in neutral or reducing atmospheres. For example, if a chromium nucleating material is used, the sintering atmosphere is preferably neutral or reducing.

Sintered Abrasive Grain

Abrasive grain made according to the method of the present invention typically has a particle size ranging from about 0.1 to about 1500 micrometers, usually between about 1 to about 1000 micrometers. A preferred abrasive grain made according to the method of the present invention is less than 30 micrometers (even less than 1 micrometer) in size.

The sintered abrasive grain can be classified into a particle size distribution by any conventional technique such as water classification, air classification, or screening. Although crushing is generally not preferred, if necessary, the abrasive grain can be crushed to provide a desired particle size.

One preferred abrasive grain prepared according to the method of the present invention comprises alumina, a divalent metal oxide, and rare earth metal oxides. The divalent metal oxide may be, for example, manganese, magnesium, or zinc oxides. The alumina, divalent metal oxide, and rare earth oxide can react to form a hexagonal rare earth aluminate, $LnMAl_{11}O_{19}$, also known as a magnetoplumbite phase, wherein M is a divalent metal cation and Ln is a trivalent metal ion such as La, Nd, Ce, Pr, Sm, Gd or Eu. This hexagonal rare earth aluminate has exceptional properties in an abrasive grain. Since there is generally excess alumina, the magnetoplumbite will form and the excess alumina will form alpha alumina. The resulting microstructure comprises alpha alumina crystallites and between these alpha alumina crystallites are aluminate platelets comprising aluminate having a magnetoplumbite crystal structure. The alpha alumina crystallites are typically less than one micrometer, generally on the order of between about 0.1 to 0.4 micrometer. A collection of these alpha alumina crystallites form a cell or domain. The adjacent alpha alumina crystallites within a cell have low angle grain boundaries. The cell size ranges from about 2 to 5 micrometers with high angle grain boundaries between adjacent cells. The aluminate platelets comprising aluminate having a magnetoplumbite crystal structure have a thickness generally between 0.04 to 0.1 micrometer, preferably between 0.04 to 0.06 micrometer.

A preferred abrasive grain prepared according to the method of the present invention includes aluminate platelets (preferably, comprising aluminate having a magnetoplumbite crystal structure), and has an outer region and inner region, the abrasive grain comprising:

(a) alpha alumina crystallites; and (b) aluminate platelets comprising aluminate having a magnetoplumbite crystal structure, the aluminate platelets being distributed between the alpha alumina crystallites, wherein the outer region includes aluminate platelets comprising aluminate having a magnetoplumbite crystal structure that are on average larger in size than aluminate platelets comprising aluminate having a magnetoplumbite crystal structure in the inner region. Typically, the platelet diameter near the outer regions of the abrasive grain is greater than in an interior region of the abrasive grain. For example, the length of aluminate platelets comprising aluminate having a magnetoplumbite crystal structure near the outer region is typically greater than about 1 micrometer, whereas the length of such platelets near the center region is less than one micrometer.

Another preferred alpha alumina-based abrasive grain prepared according to the method of the present invention has an as sintered, outer surface and a particle size less than 30 micrometers.

Figure 4:
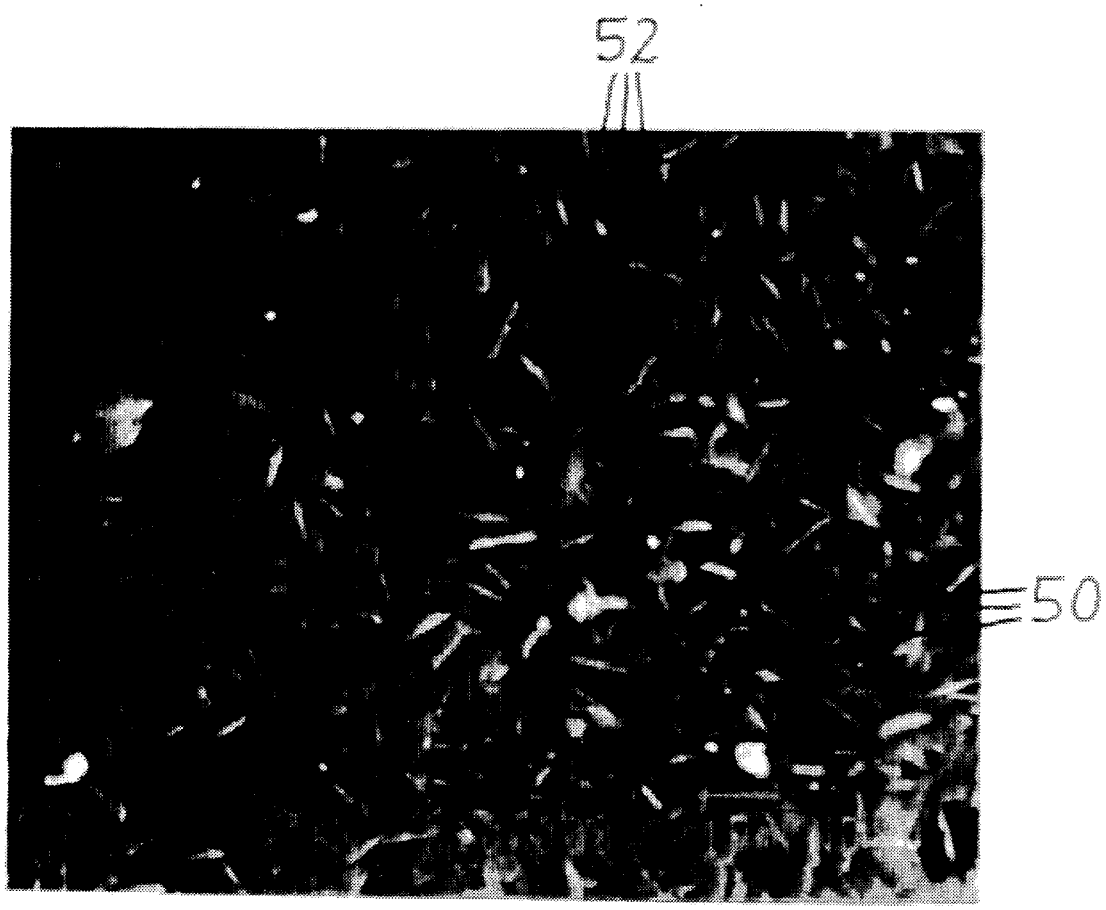
FIG. 4 is a scanning electron photomicrograph at 10,000× of the as sintered surface of an abrasive grain according to the present invention.

An example of abrasive grain having an as sintered surface is shown at 10,000× in the scanning electron photomicrograph of FIG. 4. The composition of this abrasive grain, on a theoretical oxide basis, is 95.2 percent by weight $Al_2O_3$, 1.2 percent by weight $La_2O_3$, 1.2 percent by weight $Nd_2O_3$, 1.2 percent by weight $Y_2O_3$, and 1.2 percent by weight MgO. For the abrasive grain shown in FIG. 4, alpha alumina crystallites 50 are randomly oriented with respect to adjacent crystallites. Between some of alpha alumina crystallites 50 are aluminate platelets comprising aluminate having a magnetoplumbite crystal structure 52. Platelets 52 appear to be irregularly shaped with a length to width ratio of about 3:1 to 1:1. The thickness of the platelets appears to be about 0.1 micrometer.

Addition of Coatings on the Sintered Abrasive Grain

The sintered abrasive grain can be treated to provide a surface coating thereon. Surface coatings are known to improve the adhesion between the abrasive grain and the binder in the abrasive article. Such surface coatings are described, for example, in U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 4,997,461 (Markhoff-Matheny et al.), U.S. Pat. No. 5,213,951 (Celikkaya et al.) U.S. Pat. No. 5,085,671 (Martin et al.) and U.S. Pat. No. 5,042,991 (Kunz et al.), the disclosures of which are incorporated herein by reference. Further, in some instances, the addition of the coating improves the abrading characteristics of the abrasive grain.

Abrasive Articles

Abrasive grain made according to the method of the present invention can be utilized in an abrasive agglomerate. An abrasive agglomerate comprises single abrasive grains that are bonded together to form a shaped mass. Abrasive agglomerates are further described, for example, in U.S. Pat. No. 4,311,489 (Kressner), U.S. Pat. No. 4,652,275 (Bloecher et al.), and U.S. Pat. No. 4,799,939 (Bloecher et al.), the disclosures of which are incorporated herein by reference for their teachings of abrasive agglomerates.

Abrasive grain made according to or made by the method of the present invention can be incorporated into abrasive products such as coated abrasives, bonded abrasives (including grinding wheels, cutoff wheels, and honing stones), nonwoven abrasives and abrasive brushes. Typically, abrasive products or articles comprise a binder and a plurality of abrasive grain secured within the abrasive article by the binder. Further, the abrasive grain can be used in abrasive applications utilizing slurries or abrading (e.g., polishing) compounds.

Coated abrasives generally comprise a backing, abrasive grain, and at least one binder which holds the abrasive grain to the backing.

Figure 5:
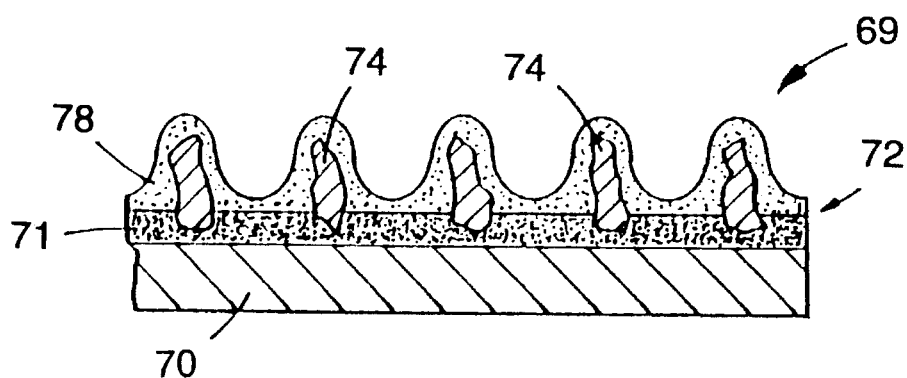
FIG. 5 is a fragmentary cross-sectional schematic view of a coated abrasive product, incorporating therein abrasive grain according to the present invention.

An example of a coated abrasive product is provided in FIG. 5 at reference numeral 69. Referring thereto, backing (substrate) 70 has abrasive layer 72 comprising abrasive grain 74 secured to a major surface of backing 70 by make coat 77 and size coat 78. In some instances, a supersize coat, not shown, may be used.

The backing can be cloth, polymeric film, fibre, nonwoven web, paper, combinations thereof, and treated versions thereof. The backing can also be a reinforced thermoplastic backing as described, for example, in the Assignee's copending application having U.S. Ser. No. 07/811,547 (Stout et al.), the disclosure of which is incorporated herein by reference. The binder can be an inorganic or organic binder. The abrasive grains can be present in one layer or in two layers of the coated abrasive. Preferred methods of making coated abrasives are described in U.S. Pat. No. 4,734,104 (Broberg) and U.S. Pat. No. 4,737,163 (Larkey), the disclosures of which are incorporated herein by reference.

The coated abrasive backing may have an attachment means on its back surface to secure the resulting coated abrasive to a support pad or back-up pad. This attachment means can be a pressure sensitive adhesive or a loop fabric for a hook and loop attachment. Alternatively, there may be an intermeshing attachment system as described in U.S. Pat. No. 5,201,101 (Rouser et al.), the disclosure of which is incorporated herein by reference.

The back side of the abrasive article may also contain a slip resistant or frictional coating. Examples of such coatings include an inorganic particulate (e.g., calcium carbonate or quartz) dispersed in an adhesive.

Bonded abrasive products are typically comprised of a shaped mass of abrasive grains held together by an organic, metallic, or vitrified binder. The bonded abrasive can be in the form of a wheel, such as a grinding wheel including a cut-off wheel, in the form of a honing stone or other conventional bonded abrasive shapes. The bond abrasive is preferably in the form of a grinding wheel. In FIG. 5, grinding wheel 79 is depicted comprising abrasive grain 80 molded in a wheel and mounted on hub 82. For additional details in the preparation of grinding wheels, see, for example, U.S. Pat. No. 4,997,461 (Markhoff-Matheny), the disclosure of which is incorporated herein by reference. The vitreous binder can be fired at relatively low temperatures (e.g., less than 1100° C.) or relatively higher temperatures (e.g., greater than 1200° C.). The vitreous binder is typically composed of 20% frit to as much as 100% frit, although lower amounts may also be useful.

Figure 6:
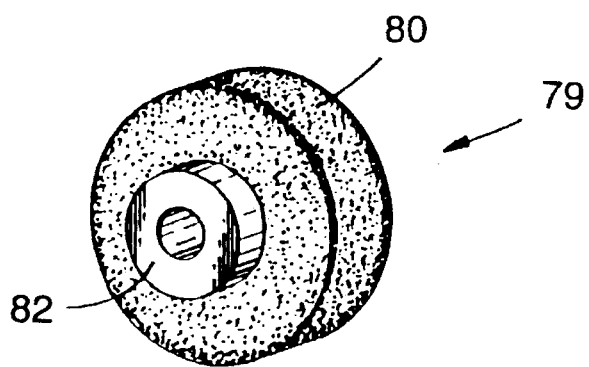
FIG. 6 is a perspective view of a bonded abrasive product incorporating abrasive grain according to the present invention.
Figure 7:
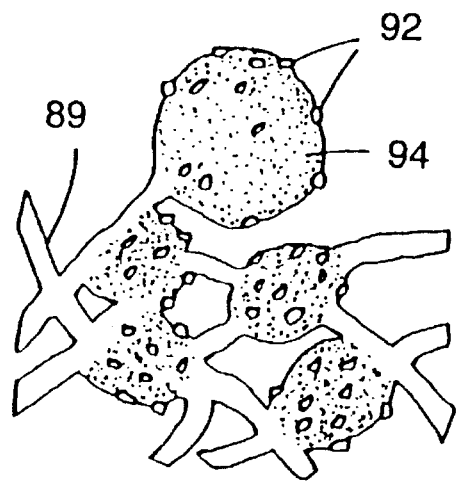
FIG. 7 is an enlarged, fragmentary, schematic view of a nonwoven abrasive product incorporating abrasive grain according to the present invention.

Nonwoven abrasive products typically include an open porous lofty polymer filament structure having abrasive grains of the invention distributed throughout the structure and adherently bonded therein by an organic binder. Examples of filaments include polyester fibers, polyamide fibers, and polyaramid fibers. In FIG. 6, a schematic depiction, enlarged about 100×, of a typical nonwoven abrasive article is provided. The article comprises fibrous mat 89 as a substrate onto which abrasive grain 92 are adhered by binder 94. For additional details in the preparation of nonwoven abrasive products, see, for example, U.S. Pat. No. 2,958,593 (Hoover et al.), the disclosure of which is incorporated herein by reference.

The binder for the abrasive article can be a thermosetting organic polymer. There are two main classes of thermosetting resins, condensation curable and addition polymerized resins. Addition polymerized resins can polymerize through a cationic mechanism or a free radical mechanism. Depending upon the energy source that is utilized and the binder precursor chemistry, a curing agent, initiator, or catalyst is sometimes preferred to help initiate the polymerization.

Examples of typical binders include phenolic resins, urea formaldehyde resins, melamine formaldehyde resins, acrylated urethanes, acrylated epoxies, ethylenically unsaturated compounds, aminoplast derivatives having pendant alpha, beta unsaturated carbonyl groups, isocyanurate derivatives having at least one pendant acrylate group, isocyanate derivatives having at least one pendant acrylate group, vinyl ethers, epoxy resins, and combinations thereof.

Phenolic resins are widely used in abrasive article binders because of their thermal properties, availability, and cost. There are two types of phenolic resins, resole and novolac. Resole phenolic resins have a molar ratio of formaldehyde to phenol of greater than or equal to one to one, typically between 1.5:1.0 to 3.0:1.0. Novolac resins have a molar ratio of formaldehyde to phenol of less than one to one.

The abrasive article and/or abrasive binder slurry can further comprise optional additives, such as, for example, fillers (including grinding aids), fibers, lubricants, wetting agents, thixotropic materials, surfactants, pigments, dyes, antistatic agents, coupling agents, plasticizers, and suspending agents. The amounts of these materials are selected to provide the properties desired.

Examples of useful fillers include metal carbonates (e.g., calcium carbonate (chalk, calcite, marl, travertine, marble and limestone), calcium magnesium carbonate, sodium carbonate, magnesium carbonate), silica (e.g., quartz, glass beads, glass bubbles and glass fibers), silicates (e.g., talc, clays, (montmorillonite) feldspar, mica, calcium silicate, calcium metasilicate, sodium aluminosilicate, sodium silicate), metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

The term filler also encompasses materials that are known in the abrasive industry as grinding aids. A grinding aid is defined as particulate material that the addition of which has a significant effect on the chemical and physical processes of abrading which results in improved performance. Examples of chemical groups of grinding aids include waxes, organic halide compounds, halide salts, sulfur and sulfur compounds, and metals and their alloys. The organic halide compounds will typically break down during abrading and release a halogen acid or a gaseous halide compound. Examples of such materials include chlorinated compounds such as tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include tin, lead, bismuth, cobalt, antimony, cadmium, iron, and titanium. Other miscellaneous grinding aids include sulfur, organic sulfur compounds, graphite and metallic sulfides.

Examples of antistatic agents include graphite, carbon black, vanadium oxide, and humectants. These antistatic agents are disclosed in U.S. Pat. No. 5,061,294 (Harmer et al.), U.S. Pat. No. 5,137,542 (Buchanan et al.), and U.S. Pat. No. 5,203,884 (Buchanan et al.), the disclosures of which are incorporated herein by reference.

A coupling agent can provide an association bridge between the binder precursor and the filler particles or abrasive grain. Examples of coupling agents include silanes, titanates, and zircoaluminates.

The abrasive articles described above can contain 100% of the abrasive grain of the invention. Additionally, the abrasive articles may contain a blend of the abrasive grains of the invention with conventional abrasive grains or diluent grains. It is preferred that the abrasive particles have a Mohs' hardness of at least about 8, more preferably above 9. Examples of such abrasive particles include fused aluminum oxide (which includes brown aluminum oxide, heat treated aluminum oxide, and white aluminum oxide), ceramic aluminum oxide made by a sol gel process, green silicon carbide, silicon carbide, chromia, alumina zirconia, diamond, ceria, cubic boron nitride, boron carbide, garnet, titanium diboride, titanium carbide, and combinations thereof. Abrasive grain according to the present invention can also be blended with diluent grains (e.g., marble, gypsum, limestone, flint, silica, glass bubbles, glass beads, iron oxide, aluminum silicate, and glass). Abrasive grain according to the present invention can also be combined with abrasive agglomerates. An example of an abrasive agglomerate is described in U.S. Pat. No. 4,652,275 (Bloecher et al.), the disclosure of which is incorporated herein by reference. However, at least 15% by weight, and preferably 50 to 100% by weight, of the grains of the abrasive product should be of the type described herein.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A plurality of abrasive grain having a specified nominal grade, said plurality of abrasive grain having a particle size distribution, by volume, ranging from fine to coarse and a median particle size less than 40 micrometers, and wherein at least a portion of said abrasive grain is a plurality of sintered, polycrystalline ceramic, alpha alumina-based abrasive grain having an as sintered outer surface.

2. The plurality of abrasive grain according to claim 1 wherein at least 30 percent by volume of said abrasive grain is within 10 micrometers of said median particle size.

3. The plurality of abrasive grain according to claim 1 wherein at least 50 percent by volume of said abrasive grain is within 5 micrometers of said median particle size.

4. The plurality of abrasive grain according to claim 1 wherein said abrasive grain have particle sizes less than 30 micrometers.

5. The plurality of abrasive grain according to claim 1 wherein said abrasive grain have particle sizes in the range from about 1 to about 25 micrometers.

6. The plurality of abrasive grain according to claim 1 wherein said abrasive grain have particle sizes less than 25 micrometers.

7. The plurality of abrasive grain according to claim 1 wherein said abrasive grain have particle sizes less than 20 micrometers.

8. The plurality of abrasive grain according to claim 1 wherein said abrasive grain have particle sizes less than 15 micrometers.

9. The plurality of abrasive grain according to claim 1 wherein said sintered, polycrystalline ceramic, alpha alumina-based abrasive grain includes, on a theoretical oxide basis, up to 15 percent by weight oxide selected from the group consisting of iron oxide, magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, europium oxide, silicon dioxide, chromium oxide, calcium oxide, strontium oxide, zirconium oxide, hafnium oxide, and combinations thereof, calculated as $Fe_2O_3$, $MgO$, $MnO$, $ZnO$, $Ce_2O_3$, $CoO$, $Ti_2O_3$, $NiO$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $SiO_2$, $Cr_2O_3$, $CaO$, $SrO$, $Zr_2O_3$, and $HfO_2$.

10. The plurality of abrasive grain according to claim 1 wherein said sintered, polycrystalline ceramic, alpha alumina-based abrasive grain comprises:

(a) alpha alumina crystallites; and (b) aluminate platelets comprising aluminate having a magnetoplumbite crystal structure, said aluminate platelets being distributed between said alpha alumina crystallites.

11. The plurality of abrasive grain according to claim 10 wherein said aluminate is represented by the formula:

$$LnMAl_{11}O_{19},$$

wherein:

Ln is a lanthanide rare earth selected from the group consisting of $La^{3+}$, $Nd^{3+}$, $Ce^{3+}$, $Pr^{3+}$, $Sm^{3+}$, $Gd^{3+}$, and $Eu^{3+}$; and M is a divalent metal cation selected from the group consisting of $Mg^{2+}$, $Mn^{2+}$, $Zn^{2+}$, $Ni^{2+}$, and $Co^{2+}$.

12. An abrasive article including:

(a) a binder; and (b) said plurality of abrasive grain according to claim 1 secured within said article by said binder.

13. An abrasive article according to claim 12 wherein said abrasive article is a grinding wheel.

14. An abrasive article according to claim 12 wherein said abrasive article is a nonwoven abrasive.

15. A coated abrasive article comprising:

(a) a backing having a major surface; and (b) an abrasive layer comprising said plurality of abrasive grain according to claim 1 secured to said major surface of said backing by a binder.

16. The plurality of abrasive grain according to claim 1 wherein at least 15 percent by weight of said abrasive grain is said alpha alumina-based abrasive grain, 17. The plurality of abrasive grain according to claim 1 wherein at least 30 percent by weight of said abrasive grain is said alpha alumina-based abrasive grain.

18. The plurality of abrasive grain according to claim 1 wherein at least 50 percent by weight of said abrasive grain is said alpha alumina-based abrasive grain.

19. The plurality of abrasive grain according to claim 1 wherein at least 75 percent by weight of said abrasive grain is said alpha alumina-based abrasive grain.

20. The plurality of abrasive grain according to claim 1 consisting essentially of said sintered, polycrystalline ceramic, alpha alumina-based abrasive grain.

21. The plurality of abrasive grain according to claim 1 further comprising abrasive grain other than said alpha alumina-based abrasive grain, said other abrasive grain having an average particle size less than the average particle size of said alpha alumina-based abrasive grain.

22. The plurality of abrasive grain according to claim 1 wherein said abrasive grain of said specified nominal grade has a median particle size less than 30 micrometers.

23. An abrasive article including:

(a) a binder; and (b) said plurality of abrasive grain according to claim 24 secured within said article by said binder.

24. A plurality of abrasive grain having a specified nominal grade, said plurality of abrasive grain having a particle size distribution, by volume, ranging from fine to coarse and a median particle size less than 40 micrometers, wherein at least a portion of said abrasive grain is a plurality of sintered, polycrystalline ceramic, alpha alumina-based abrasive grain having an as sintered outer surface and a particle size less than 30 micrometers.

25. The plurality of abrasive grain according to claim 24 wherein said sintered, polycrystalline ceramic, alpha alumina-based abrasive grain has a median particle size less than 30 micrometers.

26. An abrasive article including:
(a) a binder; and
(b) said plurality of abrasive grain according to claim 24 secured within said article by said binder.

* * * * *

UNITED STATES PATENT AND TRADEMARK OFFICE
CERTIFICATE OF CORRECTION

PATENT NO. : 5,547,479
DATED : August 20, 1996
INVENTOR(S) : Conwell et al.

It is certified that error appears in the above-indentified patent and that said Letters Patent is hereby corrected as shown below:

On the title page, under Other Publications, "Osciplate™" should be --OSCIPLATE™--

On the title page, item [54] and column 1, line 1, please change "ALPHA ABRASIVE ALUMINA-BASED" to --ALPHA ALUMINA-BASED ABRASIVE--

In column 26, line 63, please change "claim 24" to --claim 22--

Signed and Sealed this

Second Day of September, 1997

Attest:

BRUCE LEHMAN

Attesting Officer    Commissioner of Patents and Trademarks